United States Patent
Mejia Gonzalez et al.

(10) Patent No.: US 11,351,862 B2
(45) Date of Patent: Jun. 7, 2022

(54) ASSEMBLY OF A GRAPHICAL USER INTERFACE IN A TRANSPORTATION VEHICLE AND METHOD FOR PROVIDING A GRAPHICAL USER INTERFACE IN A TRANSPORTATION VEHICLE

(71) Applicant: VOLKSWAGEN AKTIENGESELLSCHAFT, Wolfsburg (DE)

(72) Inventors: Maria Esther Mejia Gonzalez, Braunschweig (DE); Heino Wengelnik, Wolfsburg (DE); Indra Lena Koegler, Berlin (DE); Frank Althoff, Lehrte (DE)

(73) Assignee: Volkswagen Aktiengesellschaft

( * ) Notice: Subject to any disclaimer, the term of this patent is extended or adjusted under 35 U.S.C. 154(b) by 235 days.

(21) Appl. No.: 16/345,977

(22) PCT Filed: Sep. 28, 2017

(86) PCT No.: PCT/EP2017/074688
§ 371 (c)(1),
(2) Date: Apr. 29, 2019

(87) PCT Pub. No.: WO2018/082847
PCT Pub. Date: May 11, 2018

(65) Prior Publication Data
US 2020/0055396 A1    Feb. 20, 2020

(30) Foreign Application Priority Data
Nov. 4, 2016  (DE) ..................... 10 2016 121 107.9

(51) Int. Cl.
*B60K 35/00*    (2006.01)
*B60K 37/06*    (2006.01)

(52) U.S. Cl.
CPC .............. *B60K 35/00* (2013.01); *B60K 37/06* (2013.01); *B60K 2370/11* (2019.05);
(Continued)

(58) Field of Classification Search
CPC combination set(s) only.
See application file for complete search history.

(56) References Cited

U.S. PATENT DOCUMENTS

2006/0007178 A1* 1/2006 Davis .................. G06F 3/04886
                                                   345/173
2007/0171193 A1* 7/2007 Nakamura ............. B60K 35/00
                                                   345/156

(Continued)

FOREIGN PATENT DOCUMENTS

| DE | 102009059866 A1 | 6/2011 |
| DE | 102013114794 A1 | 4/2015 |

(Continued)

OTHER PUBLICATIONS

Search Report for International Patent Application No. PCT/EP2017/074688; dated Jan. 31, 2018.

*Primary Examiner* — Christopher E Leiby
(74) *Attorney, Agent, or Firm* — Barnes & Thornburg, LLP

(57) ABSTRACT

An assembly of a graphical user interface in a transportation vehicle with a transportation vehicle seat to which a range is assigned and having a touchscreen arranged in the transportation vehicle relative to the transportation vehicle seat so a first sub-region of the touchscreen is arranged within the range and a second sub-region is arranged outside of the range. The assembly includes a control unit by which a virtual operating surface with an application region and an information region are generated. The virtual operating surface is output on the touchscreen so the application region extends substantially over the first sub-region of the (Continued)

touchscreen and the information region extends substantially over the second sub-region of the touchscreen. During the output process, a first section of the virtual operating surface is displayed on the touchscreen.

27 Claims, 6 Drawing Sheets

(52) U.S. Cl.
CPC ... *B60K 2370/111* (2019.05); *B60K 2370/143* (2019.05); *B60K 2370/145* (2019.05); *B60K 2370/1438* (2019.05); *B60K 2370/182* (2019.05); *B60K 2370/73* (2019.05); *B60K 2370/736* (2019.05)

(56) References Cited

U.S. PATENT DOCUMENTS

| | | | | |
|---|---|---|---|---|
| 2007/0297064 | A1* | 12/2007 | Watanabe | B60K 37/06 359/630 |
| 2008/0211779 | A1 | 9/2008 | Pryor | |
| 2009/0327977 | A1* | 12/2009 | Bachfischer | G06F 3/04812 715/863 |
| 2010/0156782 | A1* | 6/2010 | Kosinski, II | G06F 3/0425 345/173 |
| 2011/0007009 | A1* | 1/2011 | Ishihara | H04M 1/72469 345/173 |
| 2014/0152600 | A1* | 6/2014 | Lee | G06F 3/0482 345/173 |
| 2014/0263511 | A1* | 9/2014 | Clements | B60R 11/02 224/483 |
| 2014/0309864 | A1* | 10/2014 | Ricci | G01C 21/365 701/36 |
| 2015/0185999 | A1 | 7/2015 | Nam et al. | |
| 2015/0268840 | A1* | 9/2015 | Leppanen | B60K 37/06 715/771 |
| 2016/0342327 | A1* | 11/2016 | Chi | G06F 3/04886 |
| 2017/0249718 | A1* | 8/2017 | Wunderlich | G06K 9/00838 |
| 2018/0039408 | A1* | 2/2018 | Cheong | G06F 3/04886 |

FOREIGN PATENT DOCUMENTS

| | | |
|---|---|---|
| DE | 102014222980 A1 | 5/2015 |
| KR | 20150078453 A | 7/2015 |
| KR | 101542502 B1 | 8/2015 |

* cited by examiner

ASSEMBLY OF A GRAPHICAL USER INTERFACE IN A TRANSPORTATION VEHICLE AND METHOD FOR PROVIDING A GRAPHICAL USER INTERFACE IN A TRANSPORTATION VEHICLE

PRIORITY CLAIM

This patent application is a U.S. National Phase of International Patent Application No. PCT/EP2017/074688, filed 28 Sep. 2017, which claims priority to German Patent Application No. 10 2016 121 107.9, filed 4 Nov. 2016, the disclosures of which are incorporated herein by reference in their entireties.

SUMMARY

Illustrative embodiments relate to an arrangement of a graphical user interface in a transportation vehicle and to a method for providing a graphical user interface in a transportation vehicle having a transportation vehicle seat, a touchscreen and a control unit.

BRIEF DESCRIPTION OF THE DRAWINGS

The disclosed embodiments will now be explained with reference to the drawings.

DETAILED DESCRIPTION

Figure 1A:
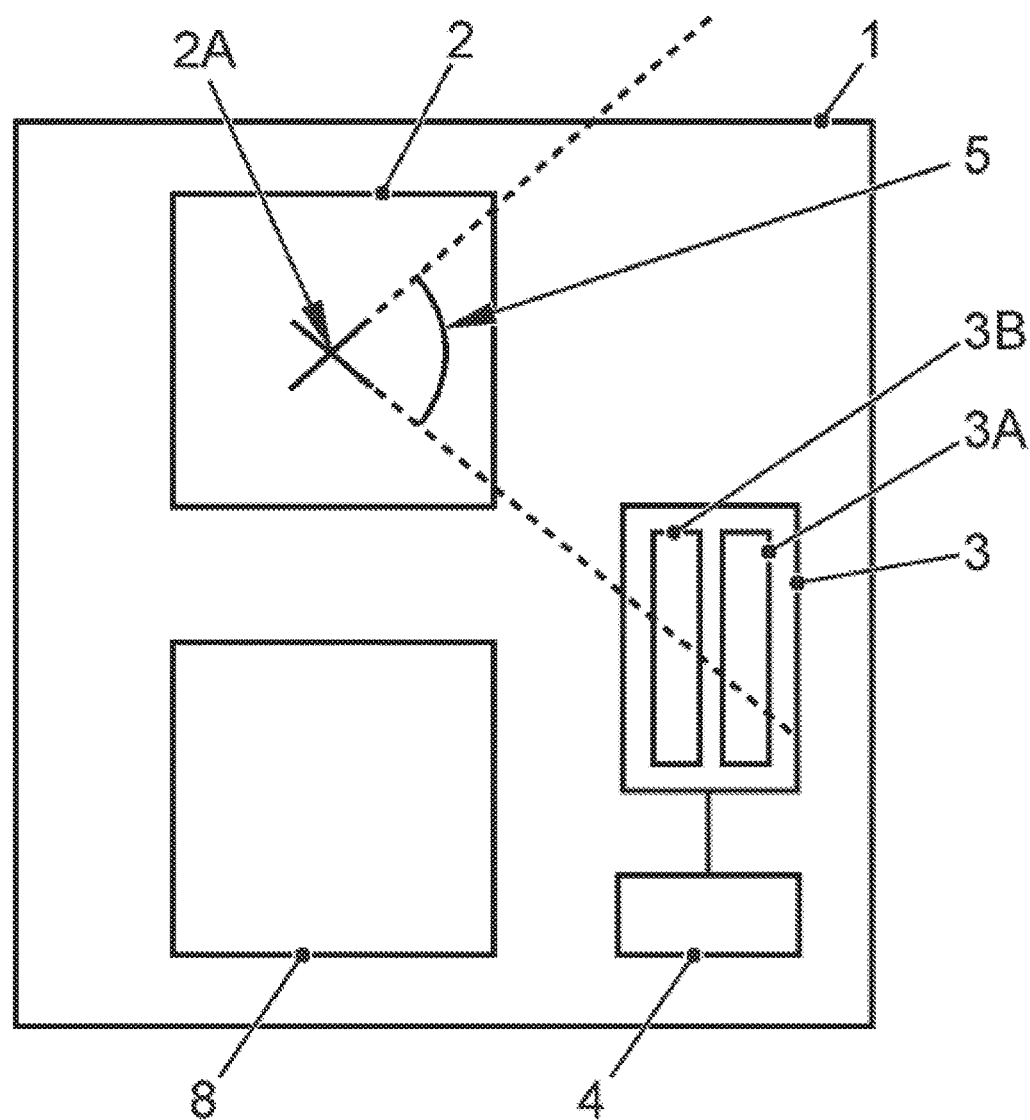
FIGS. 1A and 1B show an exemplary embodiment of the disclosed arrangement in a transportation vehicle.

The use of a wealth of electronic devices in modern transportation vehicles leads to a great need for opportunities to display information and to allow the user to exercise control. This is accomplished by touchscreens, which are now provided with increasingly large dimensions on account of falling costs and advances in technical development. They permit not only the output of data for different devices of the transportation vehicle, but also control of the devices by virtue of the detection of user inputs.

By way of example, to be able to operate different electronic devices, multifunction control systems are widely used, which comprise one or more multifunction displays and operator control elements that can be used to operate the devices. Operation is assisted or governed in this case by the information reproduced on the multifunction display. Further, such a control system can be used to select what information is meant to be displayed on the multifunction display.

In this scenario, known systems have the problem of providing the large amount of presentable information and control options in usefully and clearly structured state.

The disclosed embodiments provide an arrangement of a graphical user interface in a transportation vehicle and a method for providing a graphical user interface in a transportation vehicle that allow a user to grasp output data and to operate electronic devices quickly and clearly.

The disclosed arrangement of a graphical user interface in a transportation vehicle comprises a transportation vehicle seat that has an associated reach area, comprises a touchscreen arranged in the transportation vehicle relative to the transportation vehicle seat such that a first subarea of the touchscreen is arranged inside the reach area and a second subarea is arranged outside the reach area, and comprises a control unit by which a virtual control surface having an application area and an information area is producible. In this scenario, the virtual control surface is outputtable on the touchscreen such that the application area extends substantially over the first subarea of the touchscreen and the information area extends substantially over the second subarea of the touchscreen. In this case, output results in a first segment of the virtual control surface being displayable on the touchscreen. A control action is detectable and on the basis of the control action a second segment of the virtual control surface is outputtable on the touchscreen.

As a result, the virtual control surface is formed such that output by the touchscreen results in restricted usability on account of the position relative to the transportation vehicle seat being taken into consideration. This is relevant to the driver of the transportation vehicle, who typically has his freedom of movement restricted to a great extent, since his primary attention lies with observing the surrounding road traffic and controlling the transportation vehicle.

The transportation vehicle seat has an associated sitting position and the reach area is defined starting from the sitting position. In this case, it can be assumed, for example, that a person sitting in the transportation vehicle seat can reach and operate operator control elements of devices of the transportation vehicle with one hand within a particular radius. Allowances are also made in this case for the reach area not being able to extend over a solid angle of arbitrary size, but rather being formed on the basis of a typical field of vision of the person who is in the transportation vehicle seat, for example. By way of example, allowances are made in this case for determinations defining the maximum extent to which the line of vision of the transportation vehicle driver is permitted to deviate from the straight direction of travel.

In at least one exemplary embodiment of the disclosed arrangement, the touchscreen is thus arranged between a driver's seat and a passenger seat of the transportation vehicle, and the reach area is determinable on the basis of the driver's seat. As a result, the virtual control surface can be produced and output in a manner optimized for usability by the driver.

The reach area can be formed on the basis of data about the person who is in the transportation vehicle seat, in particular, the transportation vehicle driver. In this case, information about mobility restrictions or a body size can be taken into consideration, for example.

Also, there can be provision for the touchscreen to be arranged to the right of the steering wheel in the case of a transportation vehicle with the steering wheel on the left-hand transportation vehicle side (left-hand drive). Conversely, the touchscreen can be arranged to the left of the steering wheel in the case of a transportation vehicle with the steering wheel on the right-hand transportation vehicle side (right-hand drive).

Also, there can be provision for changeover to stipulate that transportation vehicle seat from which the reach area is meant to be defined, for example, to tailor the production of the virtual control surface to a passenger in the passenger seat.

The touchscreen is formed in a manner known per se in this case. It comprises a display panel above which a touch-sensitive surface is arranged, by which the position of a touch of an operating object can be detected. The touchscreen is in integral form or has an integral display panel. The operating object may be the fingertip of a user. The touch-sensitive surface can be, for example, a film, for example, a resistive touch film, capacitive touch film or piezoelectric film. Further, the film can be designed such that a flow of heat, for example, emanating from the fingertip of a user, is measured. Various inputs can be obtained from the trend in the touch of the film over time. By way of example, in the simplest case, the touching of the film at the particular position can be detected and assigned to a graphical object displayed on the display panel. In addition, the duration of the touch at a position or within a particular area can be detected. Further, gestures can be detected, in particular, a change in the position of the touch over time, for example, in the case of a swipe gesture.

The virtual control surface is formed in a manner known per se. A "control surface" within the context of the disclosure refers to a presentation for a human-machine interface. In this case, technical devices are operable by control elements, to which end, for example, buttons or symbols of the presentation can be used. The control surface can comprise switching and operator control elements that depict the operation of a functionality in a manner graspable by a human being. By way of example, the absolute value of a parameter can be presented and its adjustment by a settings menu can be visualized. The control surface can further comprise elements for displaying information and hence allow an output that is graspable and interpretable by a human being.

The production of the virtual control surface results in graphics data being produced, output of which by the display panel of the touchscreen results in graphical objects being displayed. The output can be provided in a subarea of the display panel, for example, within a display window. In this case, the display on the display panel can hold further graphical objects that can also be output in addition to the segment of the virtual control surface.

In at least one disclosed embodiment, the virtual control surface may be a home screen. In this case, the virtual control surface can be understood as a basic state of the display, there being the possibility of provision for an operator control element and/or an operator control apparatus that can change from other presentations directly to the home screen, and/or the home screen can be displayed when the control unit is activated, for example, when the transportation vehicle is started. The virtual control surface can further be a menu, in particular, as a menu for selecting applications, for example, on the basis of program symbols.

In this scenario, the virtual control surface is formed such that it comprises at least a first and a second segment. The virtual control surface may be an integral surface area. The segments in this case are areas of the virtual control surface that can be displayed separately from one another, the display being provided in the same area of the display panel of the touchscreen. The segments in this case are not identical, but can overlap. By way of example, the segments are arranged next to one another along the width of the virtual control surface, where they overlap. A change between the first and the second output segment is made in this case by a shift of the virtual control surface relative to the display panel of the touchscreen, with that area of the virtual control surface that is outputtable on the display panel being shifted.

The control action used to output the second segment can be detected in various manners that are known per se. The control action comprises a swipe gesture elucidating a shift of the segment and/or of the virtual control surface relative to the display panel of the touchscreen. Alternatively or additionally, the control action detected can be operation of a switching element or a further operator control apparatus.

The dimensions of the virtual control surface and of the display panel of the touchscreen differ such that the virtual control surface cannot be output on the display panel completely. By way of example, the virtual control surface has a width that exceeds the width of the display panel. Analogously, the expanse of the virtual control surface, in particular, the width, can exceed the corresponding expanse of an area of the display panel that is used for outputting the virtual control surface.

In this case, there is provision for the first segment of the virtual control surface to be formed such that it comprises at least one subarea of the information area of the virtual control surface. Further, the first segment comprises at least one portion of the application area of the virtual control surface. The second section can also comprise its subarea of the information area at the end, but there can also be provision for the information area not to be comprised by the second segment.

The virtual control surface has an application area and an information area. These are formed in different panel areas of the virtual control surface. The application area and the information area each extend over the entire height of the virtual control surface. The areas differ by virtue of the respectively output data and interaction options for a user.

In one form of the arrangement, the application area has at least one button associated with an application program. This means that it is possible to allow a user to interact with the application program and if need be the devices controlled by the latter.

In this scenario, the application program can be executed in a manner known per se by a device of the transportation vehicle, in particular, by a control unit. An "application program" is understood to mean a sequence of machine-readable instructions that are stored in volatile or nonvolatile state and, when executed by a control unit, in particular, by a processor, result in a particular function being provided.

A "button" is understood within the context of the disclosure to mean a control element of a graphical user interface. A button differs from elements and panels for the pure display of information, what are known as display elements or display panels, in that it is selectable. Selection of a button results in an associated function being performed, in particular, a function of the associated application program. The function can lead to a change in the display of information, for example, and the button can further be used to control devices whose operation is assisted by the display of information. The buttons can therefore replace conventional mechanical switches. They can be produced as desired for a user-programmable display panel and displayed by the latter. Additionally, there can be provision for analog operator control elements, for example, a switch, a control, a keyboard, a mouse, a touchpad or a joystick, to be used to perform control actions in regard to an application program associated with the button.

In a further form, the at least one button may be a widget object. A "widget object" is understood within the context of the disclosure to mean an object that is graphically presented on the display panel and that is associated with an application executed by a transportation vehicle device, for example. A widget object can use a small area of the display panel to display information for a transportation vehicle device, the information being continually updated. By way of example, the widget object can display route information of a navigation system, up-to-date reports on the weather, on the road condition and on the traffic condition, and also information concerning multimedia and/or communication devices of the transportation vehicle. The widget objects are presented independently of the further display content of the display panel. If a widget object is presented as a display window, graphical objects in the display window can also in turn be widget objects. In this scenario, the user has access to other widget objects via the display window.

There can be provision for what are known as tiles and/or display windows to be formed in the application area, the term "tiles" being used as a generalization below for these and similar structures. These comprise an area of the panel of the virtual control surface, in particular, an area in rectangular form. Output data and/or interaction options of an associated application program can be presented within a tile. In this case, the tiles can have different dimensions, the dimensions and/or positions being able to be firmly prescribed or variable. The associated application program can likewise be firmly prescribed or variable, in particular, on the basis of an input by a user.

The disclosed arrangement can have provision for no buttons to be formed in the information area. Further, there can be provision for only a single button or a few buttons to be formed in the information area. In this case, there can also be provision for a button of the information area to have low usability, for example, serving merely to change the layout of the information output. By way of example, there can be provision for a user input to be able to make a change to a particular presentation of information, for example, by virtue of selection of a particular form of layout, while the presented information itself cannot be changed.

By way of example, there can be provision for the appearance of a presented clock to be able to be changed by selecting a particular form of layout, with the type of information displayed, namely the time, not being changed. Further configuration options, as can be made possible in the application area, could have, for example, provision for a date or other information to be shown instead of the time.

It is further possible for a widget object and/or a tile to be presented in the information area, there being provision for merely an output of information to be provided here and/or for merely modest interaction options to be provided.

In one development, a selection input is detectable and the application program associated with the button is selectable. This means that a change of application program associated with the button can be made. By way of example, a selection can be made on the basis of a menu. In this case, the application programs associated with the tiles of the application area are selected and/or a displayed output of information or interaction options is/are set. In a further disclosed embodiment, an automatic selection can be made, for example, on the basis of a particular context, for example, if a particular driving situation has been detected.

In one form, the information area has an associated information functionality that is formed on the basis of an external or prescribed configuration. This means that it is possible for specific output data to be output for a user.

The information functionality can comprise, for example, a widget object by which a display of information is provided. There is no provision for an interaction option in this case. The configuration can occur in various manners that are known per se in this case and comprises, for example, an association of an application program and/or a particular content. By way of example, a prescribed configuration can be provided by a manufacturer, for example, of the transportation vehicle, of the arrangement or of a component of the arrangement. Further, an external configuration can occur, for example, by virtue of the configuration being received by a data connection to an external device, for example, a server.

In a further form, the information functionality associated with the information area comprises a clock, a greeting text, a representation of a transportation vehicle and/or a notification, for example, a push notification or a notification of an application program.

In one development, a user identification is detectable and the information area is produced on the basis of the user identification. This means that it is possible for personalization of the information area to be performed.

User identification is effected in this case in a manner known per se, for example, by an input by the user, by a login, on the basis of person recognition or on the basis of a detected identification, for example, by a mobile device of the user or a transportation vehicle key. The user identification can be used in this case to detect a particular person or affiliation to a particular group of people.

In a further exemplary embodiment, there is provision for the application area to be alternatively or additionally produced on the basis of the user identification.

In one development, the information area comprises a text message having a name of a user, for example, comprises a greeting message, a display of a time and/or a transportation vehicle representation. The transportation vehicle representation can comprise information about a status of the transportation vehicle. This means that it is possible for relevant data to be output in a manner personalized for the user of the transportation vehicle, in particular, the transportation vehicle driver.

In one form, the user identification is used to form output data of an application program, and the information area comprises an output of the output data. This means that it is possible for data of the application program that are for a specific person or group of people to be output.

By way of example, output data of an electronic diary can be output, for example, advice of the next appointment on the agenda. Further, data of an application program for receiving messages can be output, for example, by SMS or email, with, for example, a message with advice of a new message that has arrived being able to be displayed.

In a further form, the first and the second segment of the virtual control surface are formed such that all subsections of the application area are displayable in the first subarea of the touchscreen. This means that it is possible to ensure that different operable areas of the virtual control surface can be output in the first subarea inside the reach area. The subsections of the application area comprise, for example, all of the operable objects that the application area of the virtual control surface comprises. Although it is not possible for all subsections to be displayed in the reach area at the same time, in particular, not at the same time as the information area, a suitable change between the displayed segments does mean that all presented areas and all operable elements of the graphical control surface can be output such that the operable elements are in the reach area and thus operator control is rendered possible.

For example, there can be provision for displacing of the presented segment of the virtual control surface for each subsection of the application area to mean that the display can be produced such that the respective subsection is inside the reach area. All operable elements of the virtual control surface can be output inside the reach area for at least one of the presentable segments.

By way of example, a change from the first to the second segment means that the information area can be shifted from the segment presented on the display panel, so that it is no longer or only partly visible, while another area of the virtual control surface on the other side is shifted to the area of the display panel, so that output of the second segment results in a previously nonvisible area of the virtual control surface being presented. A portion of the application area that was presented inside the reach area for the first segment is shifted to outside the reach area in this case.

Further, there can be provision for the application area and the information area of the virtual control surface to be produced variably, for example, if the reach area is variable. In that case, for example, a larger reach area can result in an enlarged application area being presented, with the information area accordingly being reduced. Further, conversely, a smaller reach area can result in the presented application area being reduced and the information area being formed in enlarged state.

In one development, there can be provision for multiple segments, a change between the output segments being able to be made analogously to a change between the first and the second segments.

In one form, the second segment of the virtual control surface is shifted in comparison with the first segment. This means that it is possible for particularly intuitive operator control to be provided. The shift can occur in different directions in this case, in particular, in a horizontal or vertical direction. Further, there can be provision for different segments of the virtual control surface to be presentable, for which a shift in two directions can be performed to output different areas of the virtual control surface.

The outputtable segments can be formed continuously in this scenario, with a continuous shift along one direction, for example, along the width extent of the virtual control surface, being able to be performed in this case, for example, in proportion to a length of a swipe gesture. Alternatively or additionally, discrete outputtable segments may be defined, in which case just particular areas of the virtual control surface are outputtable as segments.

For example, the virtual control surface may be defined with two discrete segments, the entire width of the virtual control surface being no more than twice as wide as the width of the display presentable on the display panel of the touchscreen. The two discrete segments can comprise the left-hand and right-hand areas of the virtual control surface in this instance. A change between the first and the second segment can result in a continuous shift being presented in this scenario.

In a further form, the information area extends over ⅓ to ⅔ of the surface area of the first segment of the virtual control surface, in particular, over ⅓ to ⅔ of the width of the first segment. This means that it is possible to achieve clear use of the surface area available in the case of the first segment for the information area.

In this form, there is provision for the information area to be comprised by the first segment. In this scenario, there can be, for example, provision for the change to the second segment to result in a lateral shift of the virtual control surface to the right being performed, with, depending on the expanse of the information area and the shift of the virtual control surface, the information area being shifted from the presentable area and at the same time a further portion of the application area being shifted into the presentable area.

In a further form, the virtual control surface has a common area comprised by the first and the second segment. This means that it is possible for an overlap between the two segments to be presented and for a connection between the segments to be elucidated. The area of overlap is comprised by the application area. By way of example, it can comprise two tiles arranged in a central area of the virtual control surface. If the change between the first and the second segment is made by a shift, the common area can be a central area of the virtual control surface, which is presented on a first side for the first segment and on the opposite side for the second segment.

In one development, an activation action for an application program is detectable and output data producible by the application program are outputtable in the application area. The information area remains unchanged in this scenario, or the output data presented in the information area are presented in an information area formed in an altered manner. By way of example, retrieval of an application program in a full-screen presentation can result in the whole application area being taken up by output data of the application program. In this case, there can be provision for the information area to continue to be maintained as of the virtual control surface or to be altered, with, for example, information being displayed in an altered arrangement.

The disclosed method is used for providing a graphical user interface in a transportation vehicle having a transportation vehicle seat, a touchscreen, and a control unit. The method results in the transportation vehicle seat being assigned a reach area and the touchscreen being arranged relative to the transportation vehicle seat such that a first subarea of the touchscreen is arranged inside the reach area and a second subarea is arranged outside the reach area. The control unit produces a virtual control surface having an application area and an information area, wherein the virtual control surface is output on the touchscreen such that the application area extends substantially over the first subarea of the touchscreen and the information area extends substantially over the second subarea of the touchscreen. Output results in a first segment of the virtual control surface being displayed on the touchscreen, a control action is detected and on the basis of the control action a second segment of the virtual control surface is output on the touchscreen.

The disclosed method may be designed to use the above-described arrangement to provide a graphical user interface. The method therefore has the same benefits as the arrangement.

In at least one exemplar embodiment of the disclosed method, a user identification is detected and the information area is produced on the basis of the user identification. This means that it is possible for a personalized output to be provided, in particular, on the basis of an information functionality whose output data are displayed in the information area.

Figure 1B:
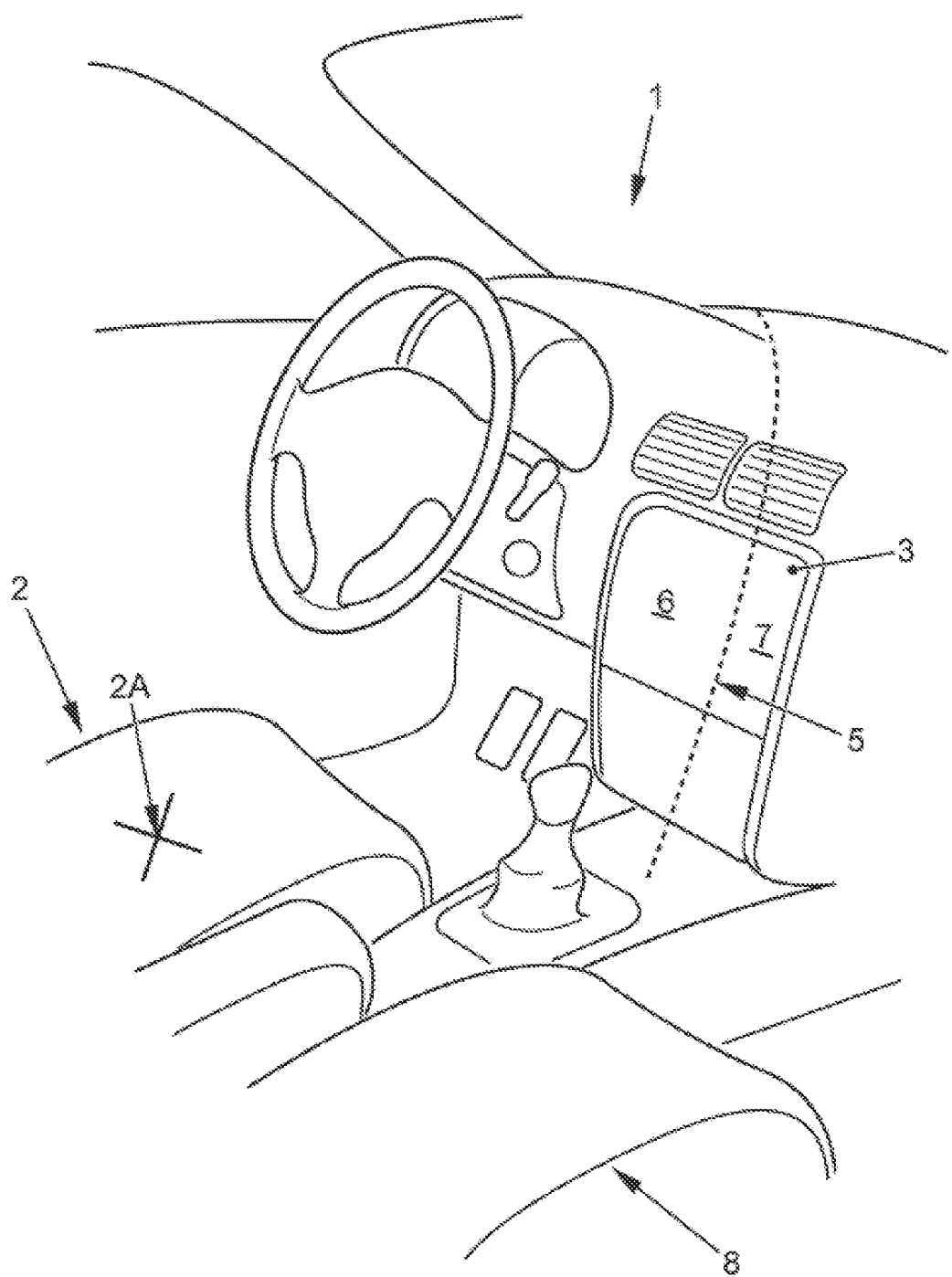

An exemplary embodiment of the disclosed arrangement in a transportation vehicle is explained with reference to FIGS. 1A and 1B.

A transportation vehicle 1 comprises a driver's seat 2 and a passenger seat 8. In the area of the driver's seat 2, a sitting position 2a is defined, from which a reach area 5 is indicated by dashed lines and an angle. The reach area 5 is defined in the exemplary embodiment such that a driver of the transportation vehicle 1 who is sitting in the driver's seat 2 can use one hand to reach a dashboard of the transportation vehicle 1 inside the reach area 5 and to perform control actions there.

The transportation vehicle 1 further comprises a touchscreen 3 having a display panel 3a and a touch-sensitive surface 3b, which is arranged above the display panel 3a and can detect a position of a touch by a finger of the driver. In this case, the touchscreen 3 is arranged such that a first subarea 6 is arranged inside the reach area 5 and a second subarea 7 is arranged outside the reach area 5. That is to say that the driver sitting in the driver's seat 2 can reach the first subarea 6 with his finger, and perform control actions, without difficulty from his sitting position 2a, whereas he can reach the second subarea 7 only by bending his upper body forward in the direction of the touchscreen 3. The definition of the reach area 5 further takes into consideration that the driver can only avert his gaze from the direction of travel of the transportation vehicle 1 within a particular area, to observe the surrounding traffic and to control the transportation vehicle 1.

The touchscreen 3 has a control unit 4 of the transportation vehicle 1 coupled to it that can transmit graphics data to the touchscreen 3, where they are displayed on the display panel 3a. Further, data captured by the touch-sensitive surface 3b of the touchscreen 3 can be transmitted to the control unit 4.

In further exemplary embodiments, there is provision for further operator control elements, for example a switch, a rotary push control, a keyboard, a mouse, a joystick or a touchpad, by which operation of a graphical user interface displayed on the display panel 3a of the touchscreen 3 can be performed, in particular, as an alternative to operation using the touch-sensitive surface 3b.

Figure 2A:
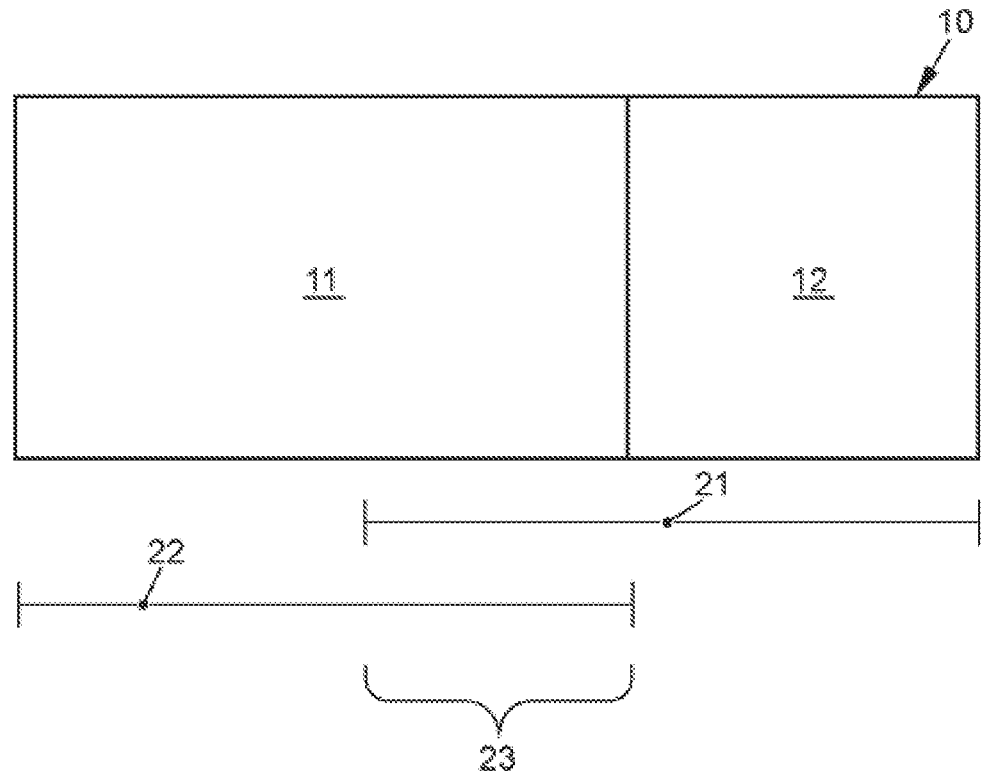
FIGS. 2A to 2C show an exemplary embodiment of a virtual control surface produced by the disclosed method.

An exemplary embodiment of a virtual control surface produced by the disclosed method is explained with reference to FIGS. 2A to 2C. In this case, the starting point taken is the exemplary embodiment of the disclosed arrangement in a transportation vehicle that is explained above with reference to FIGS. 1A and 1B.

A virtual control surface 10 is produced by the control unit 4, and graphics data of the virtual control surface 10 are transmitted to the touchscreen 3, where they are output by the display panel 3a. The virtual control surface 10 comprises an application area 11 and an information area 12. Further, a first segment 21 and a second segment 22 are defined, the two segments 21, 22 each extending over the whole height of the virtual control surface 10 and being defined on the basis of the width extent of the virtual control surface 10. The segments 21, 22 are in an overlapping arrangement, so that a common area 23 is formed.

Figure 2B:
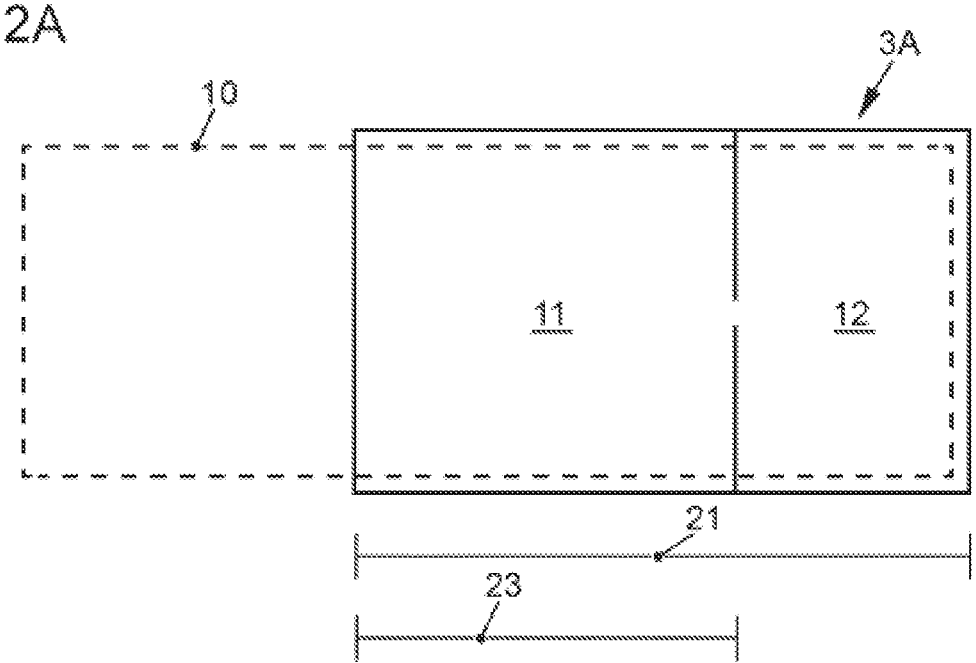
Figure 2C:
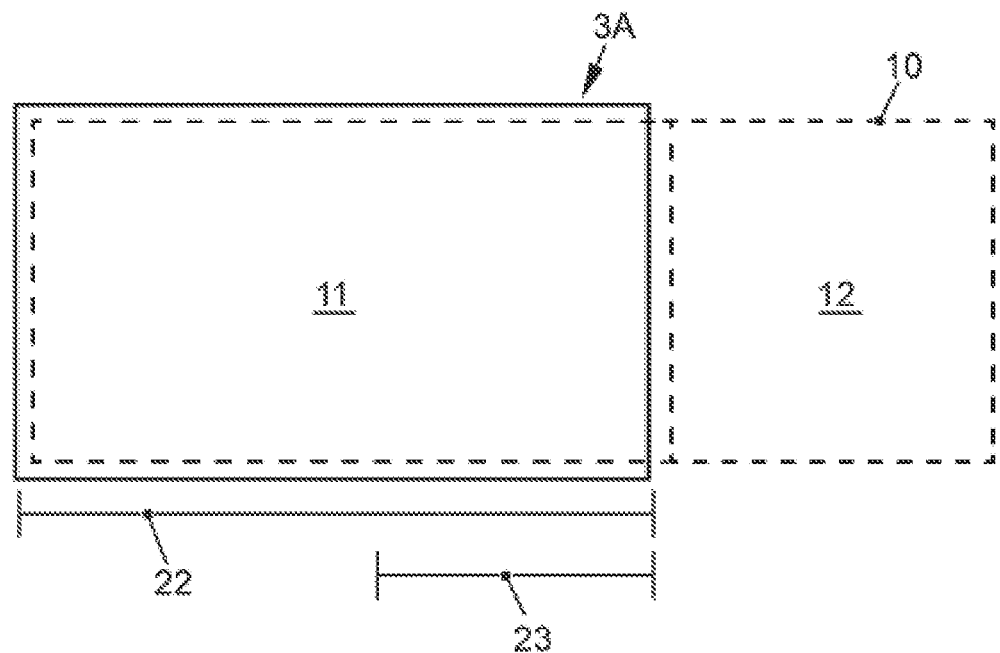

In the case depicted in FIG. 2B, the first segment 21 is displayed on the display panel 3a. The first segment comprises the information area 12 and the right-hand area of the application area 11 of the virtual control surface 10. In the case depicted in FIG. 2C, the virtual control surface 10 is shifted to the right in comparison with the case depicted in FIG. 2B, so that the inflation area 12 virtual control surface 10 is no longer visible, but rather the application area 11 fills the whole display panel 3a. In a further exemplary embodiment, there can be provision for the inflation area 12 to be formed such that for a particular segment 21, 22 it fills the whole area of the display panel 3a in which the segment 21, 22 of the virtual control surface 10 is output.

The change between the presented segments 21, 22 is triggered in the case of the exemplary embodiment by a swipe gesture on the touch-sensitive surface 3b of the touchscreen in a lateral direction. The change from the case depicted in FIG. 2B to the case depicted in FIG. 2C is made by a swipe gesture on the touch-sensitive surface 3b to the right, with the virtual control surface 10 being "dragged" to the right and a continuous movement from the first 21 to the second 22 segment being presented. The opposite change is made analogously by a swipe gesture from right to left.

In further exemplary embodiments, there is provision for the common area 23 to be in a larger or smaller form than depicted in the exemplary embodiment. The segments 21, 22 of the virtual control surface 10 may be formed such that they adjoin one another and do not overlap, so that no common area 23 is formed.

In further exemplary embodiments, multiple segments of the virtual control surface 10 are outputtable. There can be provision for the shift of the virtual control surface 10 relative to the display panel 3a to occur continuously, with a control action being able to select the segment output on the display panel 3a accurately along the width extent of the virtual control surface 10.

In further exemplary embodiments, there is alternatively or additionally provision for a shift in a vertical direction, so that the segment of the virtual control surface 10 that is output on the display panel 3a can also be shifted along the vertical extent.

In further exemplary embodiments, as an alternative or in addition to operation by swipe gestures, there is provision for a change between different segments 21, 22 of the virtual control surface 10 to be triggered by operation of an operator control element 9. The operator control element 9 can be displayed on the display panel 3a of the touchscreen 3 in this case, with operation being detected using the touch-sensitive surface 3b. The operator control element 9 can further be embodied using analog methods or mechanisms, for example, by a mechanical pushbutton switch. Further, there can be provision for operation by gestures in space without touching the touch-sensitive surface 3b and/or by voice control.

Figure 3A:
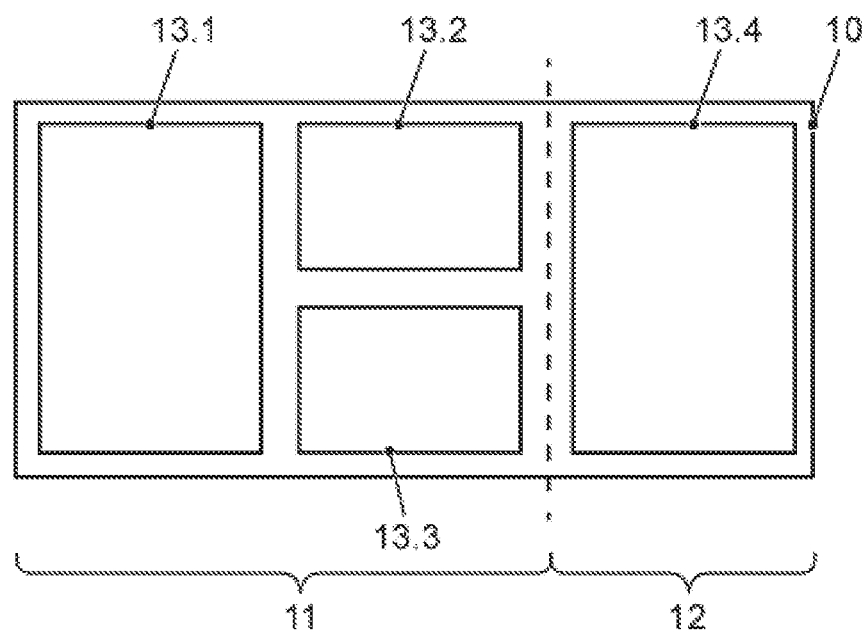
FIGS. 3A to 3C show a further exemplary embodiment of a virtual control surface produced by the disclosed method.

A further exemplary embodiment of a virtual control surface produced by the disclosed method is explained with reference to FIGS. 3A to 3C. In this case, the starting point taken is the exemplary embodiment of the disclosed arrangement in a transportation vehicle that is explained with reference to FIGS. 1A and 1B. Further, the virtual control surface is produced analogously to the exemplary embodiment of the disclosed method that is described with reference to FIGS. 2A to 2C.

The virtual control surface 10 comprises an application area 11 and an information area 12. Subareas of the virtual control surface 10 are widget objects 13.1 to 13.4 that have different associated application programs. The application programs are executed by the control unit 4 of the transportation vehicle 1, with output data being produced that are output using the respectively associated widget objects 13.1 to 13.4. In other exemplary embodiments, the application area 11 and the information area 12 alternatively or additionally comprise application windows and/or other structures known per se for outputting output data from application programs.

In a further exemplary embodiment, there is provision for no widget object 13.4 to be displayed in the information area 12, but rather for output data to be displayed directly on the virtual control surface 10.

In a further exemplary embodiment, there is further provision for program symbols to be displayed in the application area 11 that, when selected, allow a respective associated application program to be opened, in particular, in a full-screen presentation. The program symbols are arranged as a "grid" in this case.

The widget objects 13.1 to 13.3 of the application area 11 are formed such that information can be displayed to a user and/or user inputs can be detected. Further, there is provision for the association of the application programs with the widget objects 13.1 to 13.3 to be able to be altered by a user input. By way of example, operation of an operator control element of a widget object 13.1 to 13.3 is detected in this case, a menu having different application programs is displayed and a selection of a specific application program is detected. The associated application program for a widget object 13.1 to 13.3 can also be selected in another manner known per se.

Further, there is provision for the information area 12 with the widget object 13.4 to have a firmly prescribed configuration. In the exemplary embodiment, this configuration is prescribed by the manufacturer of the transportation vehicle 1, but it can be stipulated in another manner in other exemplary embodiments. There can be provision for an update option, in the case of which, for example, an update to control software of the control unit 4 prescribes the configuration of the display in the information area 12.

Interactions and/or configuration settings of a user with the presented display of the virtual control surface 10 in the information area 12 are either not provided for or very small in scope. By way of example, there can be provision for the layout of an output of information, for example, the format of an output of a time, to be configurable by a user. Further, there can be provision for selection of a personal image and/or decorative element by a user.

Figure 3B:
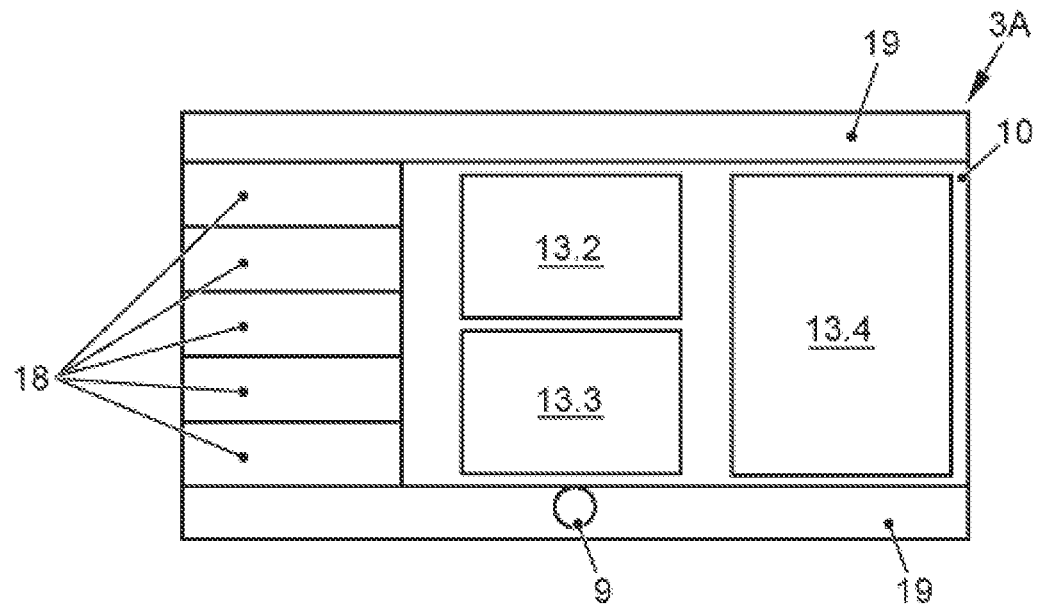
Figure 3C:
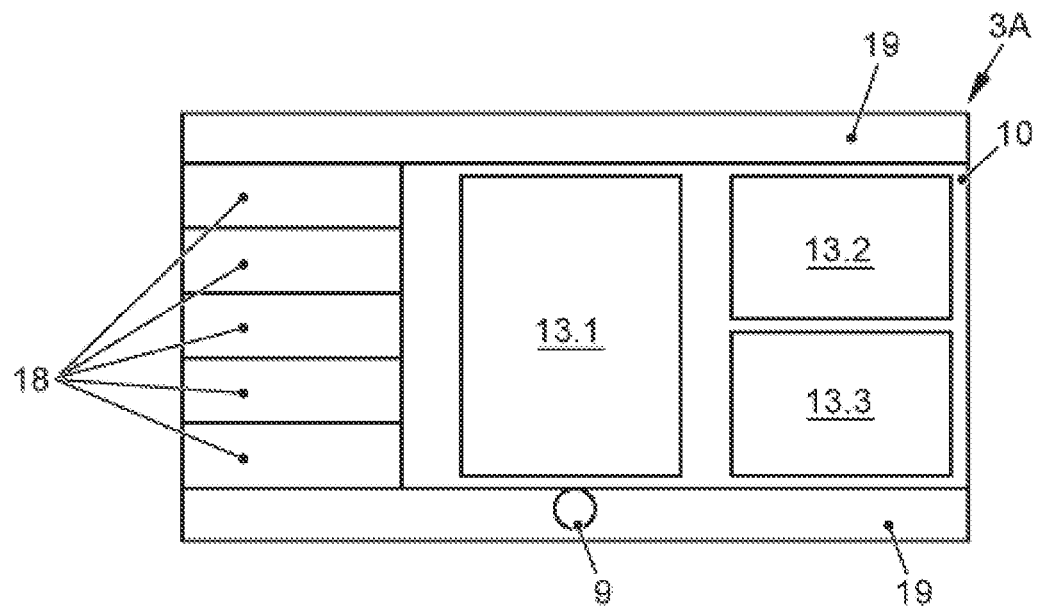

FIGS. 3B and 3C show two cases of the output of the virtual control surface 10 on the display panel 3*a*. On the display panel 3*a*, display areas 19 are output at the upper and lower edges of the display panel 3*a*. In the exemplary embodiment, these comprise status information, for example, a connection status of a mobile radio network.

Further, the lower display area 19 comprises an operator control element 9 that is a round button in a manner known per se. By operating the operator control element 9, a user can cause a shift of presented virtual control surface 10 and hence a change of the output segment. Further, buttons 18 are output on the display panel 3*a* in a lateral area, the buttons being associated with, for example, applications for adjusting particular devices of the transportation vehicle 1 that can be called independently of the content that is output in the area of the virtual control surface 10.

Further, there is provision for a swipe gesture to be detected and the change between the first segment 21 and the second segment 22 to be made on the basis of the swipe gesture. Also, there can be provision for an operator control element 9 to be embodied as an analog switch or in another manner known per se.

In the case depicted in FIG. 3B, the output on the display panel 3*a* comprises a first segment of the virtual control surface 10, wherein the information area 12 with the widget object 13.4 and the application area 11 with the widget objects 13.2 and 13.3 are output. In this case, operating the operator control element 9 allows presented segment of the virtual control surface 10 to be shifted, so that a leftward-shifted segment of the virtual control surface 10 depicted in FIG. 3A is output on the display panel 3*a*. This case is depicted in FIG. 3C, wherein the displayed segment of the virtual control surface 10 comprises the application area 11 with the widget objects 13.1 to 13.3, while the information area 12 is not presented.

An exemplary embodiment of a displayed first segment of a virtual control surface is explained with reference to FIG. 4. In this case, the starting point taken is the exemplary embodiment of the disclosed arrangement in a transportation vehicle that is explained above with reference to FIGS. 1A and 1B. Further, the virtual control surface is produced analogously to the exemplary embodiments of the disclosed method that are described with reference to FIGS. 2A to 2C and FIGS. 3A to 3C.

Elements of the application area 11 and of the information area 12 are output on the display panel 3*a*. In the application area 11, two widget objects 13.2, 13.3 are formed that present output data of associated application programs. These are application programs for the weather forecast (upper widget object 13.2) and for the output of multimedia content (lower widget object 13.3). In this scenario, the widget objects 13.2 and 13.3 in the application area 11 permit interaction with the user, for example, control of a reproduction volume (lower widget object 13.3). In the information area 12, the current time is output by an appropriate display 15, whose type of presentation can be configured by a user input. Further, a text message 14 is output, a personalized greeting message in the case depicted. Further, in this exemplary case, there is provision for a notification of an application program to be output, the next appointment in an electronic diary in the case depicted. Further, a transportation vehicle representation 16 is output in the information area 12, with a status of the transportation vehicle being displayed in this case, in particular, advice of a warning.

In a further exemplary embodiment, there can be provision for the transportation vehicle representation 16 to be provided dynamically, with an animated movement of the transportation vehicle representation 16 being output when an operating object approaches the touch-sensitive surface 3*b* of the touchscreen 3. The transportation vehicle representation 16 can be provided such that the transportation vehicle representation 16 is matched to the actual appearance of the transportation vehicle 1, for example, on the basis of the representation of the color or of the hub caps. In further exemplary embodiments, it is alternatively or additionally possible for other information to be output, for example, a current date, a brand identification graphic, for example, a brand, a logo, a background image and/or a decorative image.

There is provision for no or no more than one button to be arranged in the information area 12, that is to say that interaction options for a user with the virtual control surface 10 are severely limited in the information area 12 in comparison with the application area 11.

An exemplary embodiment of a display produced for the disclosed arrangement will be explained with reference to FIG. 5. In this case, the starting point taken is the exemplary embodiment of a displayed first segment of a virtual control surface that is explained above with reference to FIG. 4.

Figure 4:
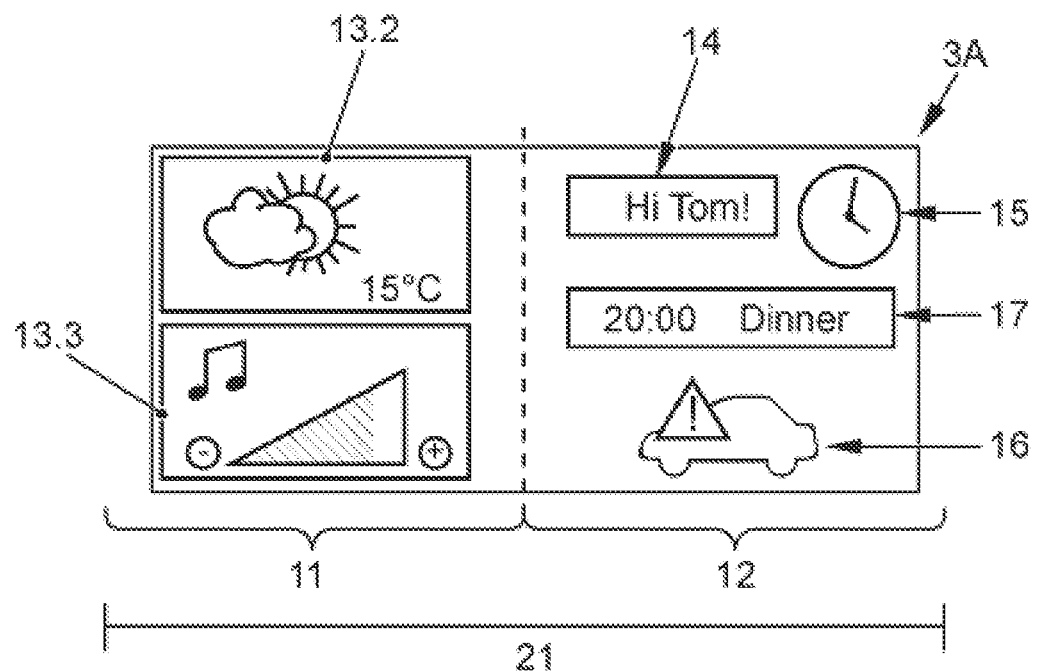
FIG. 4 shows an exemplary embodiment of a displayed first segment of a virtual control surface.
Figure 5:
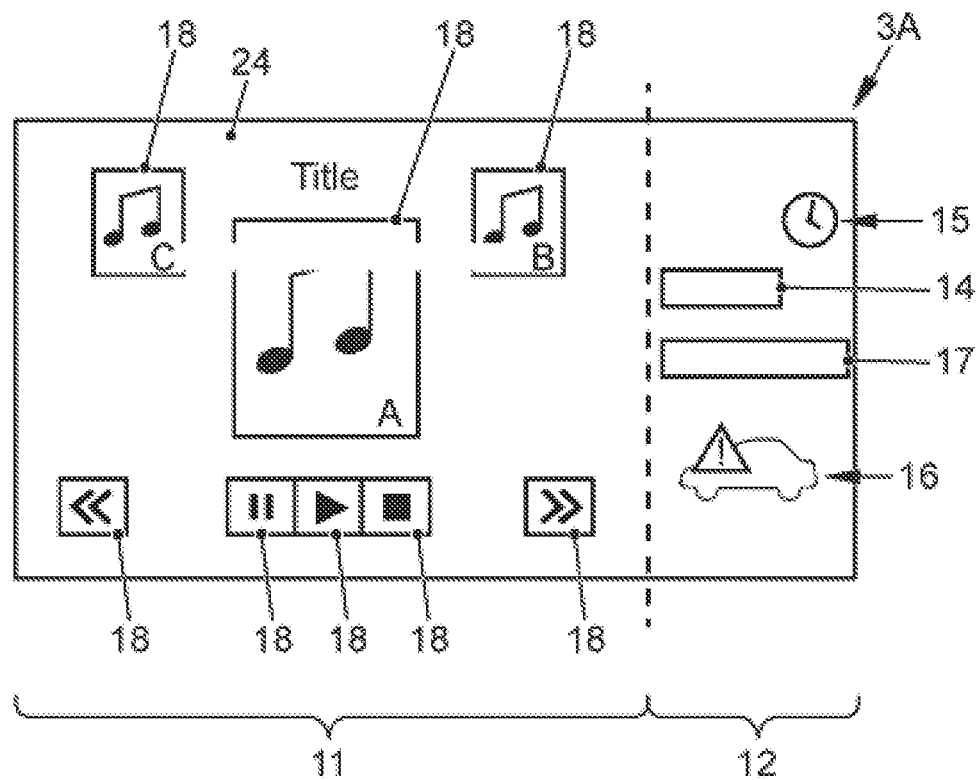
FIG. 5 shows an exemplary embodiment of a display produced for the disclosed arrangement.

In the exemplary embodiment, there is provision for a full-screen presentation, as depicted in FIG. 5, to be called by virtue of a user operating one of the widget objects 13.2, 13.3, which are output in the application area 11, on the display of the virtual control surface 10 that is depicted in FIG. 4 such that a full-screen presentation 24 of the associated application, a multimedia application in the case depicted, is activated.

The full-screen presentation 24 comprises buttons 18 that control the playback of a music track and allow a music track for playback to be selected by a user. The full-screen presentation 24 extends over the application area 11, which, in the exemplary embodiment, is formed such that it is arranged completely inside the reach area 5 of the transportation vehicle 1. Arranged laterally to the right of that, outside the reach area 5 in the exemplary embodiment, is the information area 12, which is reduced in comparison with the case depicted in FIG. 4, but the information content of which has remained substantially the same in comparison with the case depicted in FIG. 4.

In a further exemplary embodiment, the full-screen presentation 24 extends over the whole width of the presented virtual control surface 10, and the information area 12 is arranged in an upper area of the display panel 3a, for example. In this case, it is possible for the change from the case depicted in FIG. 4, in which data of the application programs are output using the widget objects 13.2, 13.3, to the full-screen presentation 24 depicted in FIG. 5 to be formed in different manners, for example, by virtue of an animated alteration of the size and/or arrangement of the detection area 12 and of the information functionalities 14, 15, 16, 17 output therein.

In a further exemplary embodiment, there can be provision for the information area 12 to be able to be output on the display panel 3a as a full-screen presentation 24. This can be effected automatically or using manual activation, for example.

LIST OF REFERENCE SIGNS

1 Transportation vehicle
2 Transportation vehicle seat; driver's seat
2a Sitting position
3 Touchscreen
3a Display panel of the touchscreen
3b Touch-sensitive surface of the touchscreen
4 Control unit
5 Reach area
6 First subarea of the touchscreen
7 Second subarea of the touchscreen
8 Passenger seat
9 Operator control element
10 Virtual control surface
11 Application area
12 Information area
13.1, 13.2, 13.3, 13.4 Button; widget object
14 Text message (display)
15 Display of time (display)
16 Transportation vehicle representation (display)
17 Notification (display)
18 Button
19 Display areas
21 First segment of the virtual control surface
22 Second segment of the virtual control surface
23 Common area of the virtual control surface
24 Full-screen presentation

The invention claimed is:

1. An arrangement of a graphical user interface in a transportation vehicle, the arrangement comprising:
a transportation vehicle driver seat having an associated reach area that is based on a position of the transportation vehicle driver seat and takes into account a maximum extent to which a line of vision of the transportation vehicle driver is permitted to deviate from a straight direction of travel;
a touchscreen arranged in the transportation vehicle relative to the transportation vehicle driver seat so a first subarea of the touchscreen is arranged inside the reach area and a second subarea is arranged outside the reach area; and
a control unit configured to produce a virtual control surface having an application area including operable elements for controlling operation of transportation functionality and an information area including only information,
wherein the virtual control surface is output on the touchscreen so the application area extends substantially over the first subarea of the touchscreen and the information area extends substantially over the second subarea of the touchscreen,
wherein output of the virtual control surface results in a first segment of the virtual control surface being displayed on the touchscreen,
wherein a second segment of the virtual control surface is output on the touchscreen based on detection of a control action, and
wherein the touchscreen is arranged between a driver's seat and a passenger seat of the transportation vehicle and all operable elements of the virtual control surface are output inside the reach area.

2. The arrangement of claim 1, wherein the application area has at least one button associated with an application program.

3. The arrangement of claim 2, wherein the arrangement is configured to detect a selection input and the button is configured to enable selection of the application program using the associated button.

4. The arrangement of claim 1, wherein the information area has an associated information functionality that is formed based on an external or prescribed configuration.

5. The arrangement of claim 3, wherein the arrangement is configured to detect a user identification and the information area is produced based on the user identification.

6. The arrangement of claim 5, wherein the information area comprises a text message having a name of a user, a display of a time and/or a transportation vehicle representation.

7. The arrangement of claim 5, wherein the user identification is used to form output data of an application program, and the information area comprises an output of the output data.

8. The arrangement of claim 1, wherein the first and the second segment of the virtual control surface are formed so that all subsections of the application area are displayed in the first subarea of the touchscreen.

9. The arrangement of claim 1, wherein the second segment of the virtual control surface is shifted in comparison with the first segment.

10. The arrangement of claim 1, wherein the information area extends over ⅓ to ⅔ of the surface area of the first segment of the virtual control surface.

11. The arrangement of claim 1, wherein the virtual control surface has a common area comprised by the first and the second segment.

12. The arrangement of claim 1, wherein an activation action for an application program is detected and output data produced by the application program are output in the application area.

13. The arrangement of claim 1, wherein the shift of the virtual control surface relative to the display panel occur continuously, wherein a control action of the driver is analyzed to select segment output on the display panel along the width extent of the virtual control surface.

14. A method for providing a graphical user interface in a transportation vehicle having a transportation vehicle seat, a touchscreen and a control unit, the method comprising:
assigning a reach area to the transportation vehicle driver seat based on a position of the transportation vehicle driver seat and taking into account a maximum extent to which a line of vision of the transportation vehicle driver is permitted to deviate from a straight direction of travel;

positioning the touchscreen in the transportation vehicle relative to the transportation vehicle seat so a first subarea of the touchscreen is arranged inside the reach area and positioning a second subarea outside the reach area; and producing, by the control unit, a virtual control surface having an application area including operable elements for controlling operation of transportation functionality and an information area including only information;

outputting, the virtual control surface on the touchscreen so the application area extends substantially over the first subarea of the touchscreen and the information area extends substantially over the second subarea of the touchscreen, wherein the output of the virtual control surface results in a first segment of the virtual control surface being displayed on the touchscreen;

detecting a control action; and outputting a second segment of the virtual control surface on the touchscreen based on the control action, wherein the touchscreen is arranged between a driver's seat and a passenger seat of the transportation vehicle and all operable elements of the virtual control surface are output inside the reach area.

15. The method of claim 14, wherein a user identification is detected and the information area is produced based on the user identification.

16. The method of claim 14, wherein the application area has at least one button associated with an application program.

17. The method of claim 16, wherein selection input is detected and selection of the application program is performed using the associated button.

18. The method of claim 14, wherein the information area has an associated information functionality that is formed based on an external or prescribed configuration.

19. The method of claim 16, wherein the information area is produced based on detection of a user identification.

20. The method of claim 19, wherein the information area comprises a text message having a name of a user, a display of a time and/or a transportation vehicle representation.

21. The method of claim 19, wherein the user identification is used to form output data of an application program, and the information area comprises an output of the output data.

22. The method of claim 14, wherein the first and the second segment of the virtual control surface are formed so that all subsections of the application area are displayed in the first subarea of the touchscreen.

23. The method of claim 14, wherein the second segment of the virtual control surface is shifted in comparison with the first segment.

24. The method of claim 14, wherein the information area extends over ⅓ to ⅔ of the surface area of the first segment of the virtual control surface.

25. The method of claim 14, wherein the virtual control surface has a common area comprised by the first and the second segment.

26. The method of claim 14, wherein an activation action for an application program is detected and output data produced by the application program are output in the application area.

27. The method of claim 14, wherein the shift of the virtual control surface relative to the display panel occur continuously, wherein a control action of the driver is analyzed to select segment output on the display panel along the width extent of the virtual control surface.

* * * * *